Nov. 10, 1953  F. RIEBER  2,658,579
GEOPHYSICAL DISPLAY SYSTEM
Filed Aug. 17, 1949  3 Sheets-Sheet 1

INVENTOR,
FRANK RIEBER, DECEASED
LU GARDA RIEBER, EXECUTRIX
BY

ATTORNEYS

Fig. 2.

Nov. 10, 1953      F. RIEBER      2,658,579

GEOPHYSICAL DISPLAY SYSTEM

Filed Aug. 17, 1949      3 Sheets-Sheet 3

INVENTOR,
FRANK RIEBER, DECEASED
LU GARDA RIEBER, EXECUTRIX
BY
Lippincott & Smith
ATTORNEYS Patented Nov. 10, 1953

2,658,579

UNITED STATES PATENT OFFICE 2,658,579

GEOPHYSICAL DISPLAY SYSTEM

Frank Rieber, deceased, late of New York, N. Y., by Lu Garda Rieber, executrix, New York, N. Y., assignor to Geovision Incorporated, a corporation of New York Application August 17, 1949, Serial No. 110,744

20 Claims. (Cl. 181—.5)

This invention relates to apparatus and methods for displaying geophysical data, particularly to methods for displaying seismographic data on terrain surveyed by the "reflection method" of seismic exploration, and it is a development of and an improvement on the so-called "Sonograph Method" of geophysical analysis which is disclosed in prior patents, Numbers 2,051,153 and 2,144,812 of the same inventor.

In accordance with the method mentioned a charge of explosive is fired in a position which is carefully surveyed with respect to a plurality of geophones or receptors sensitive to seismic waves which convert such waves into electrical waves of corresponding character. The waves produced by the explosion are propagated into the earth, and a portion of each wavefront is reflected back toward the geophones each time that the wavefront encounters a stratum having different propagation characteristics from that through which it has been traveling. The significant data desired from this operation are the times of arrival of the successive wavefronts at the various geophones, from which the position of reflecting beds or strata may be computed with greater or less accuracy, depending upon how accurately the velocity of propagation of the waves in the various strata is known.

In conventional methods of seismic exploration, the electric waves are fed directly into a seismograph which immediately records the waves as a plurality of graphs wherein the amplitudes of the waves are plotted as ordinates against time as the abscissa, whereafter these graphs are compared and analyzed by an operator and deductions drawn from them. In the method disclosed by the prior patents mentioned, however, the electrical waves picked up by the geophones are recorded in a phonographically reproducible manner and are thereafter "played back" into a seismograph or other device which combines the waves from the various geophones, with or without the introduction into the playback of additional data as to direction of arrival, velocity of propagation, or other factors. The waves having been phonographically recorded, they may be played back an indefinite number of times, thus effectively repeating the effect of the seismic shock as often as may be required without the expenses or dangers of an actual repetition of the field operation.

In accordance with conventional methods of shooting, the explosive charge is usually placed at the bottom of a bore hole which preferably penetrates through the so-called "weathered layer" into the conformable strata which underlie it. The expense of drilling the hole wherein the explosive is detonated is a major expense in conducting seismic explorations. Many geophones are used in picking up each "shot" and as a general rule it is not practical to penetrate the weathered layer in their placement. Ordinarily the weathered layer is loosely compacted, and the velocity of wave propagation through it is very low in comparison with the velocity in the strata beneath. Furthermore, the weathered layer is always more or less eroded, so that its thickness beneath the various geophones may vary very greatly. Accordingly, the datum used in geophysical measurements is taken as the bottom of the weathered layer, and a subtractive correction is made from the actual times of arrival of the waves at the geophones to reduce the records to this datum, the amount of these corrections having previously been determined by separate measurements.

The ultimate purpose in explorations of the type referred to is to prepare a map or plot of a section or sections through the earth showing the lie or inclination of the strata or other formation beneath the surface. The arrival of a single wavefront at a single geophone defines an approximately ellipsoidal locus at which a reflecting interface is located. Each reflection therefore involves the making of an elliptical plot with respect to each separate geophone. The elliptical geometry involved is tedious, and if the data can be converted effectively into a form which can be handled by spherical methods the plotting is much facilitated.

In accordance with the present invention, the outputs of the various geophones in an exploratory array are recorded as tracks having varying light reactive characteristics; preferably, that is, as variable density tracks of the type used in sound-on-film recording, although variable area recording may be used. These tracks are then scanned and rescanned rapidly in much the same manner as is used in scanning a television field, and are simultaneously reproduced electronically as seismograms on a display surface. The manner of scansion differs, however, from television scanning in that means are provided for displacing one of the beams longitudinally of the tracks, i. e., in the direction of the time axis of each track, by an amount which is individual to each track, so that the zero of the time scale of the resulting curve differs with respect to each geophone. Preferably means are provided for effecting this displacement of the beam in two steps; the first step being an increment individual to each geophone and representing weathering correction, and the second step being a displacement which is proportional to the displacement that is applied in scanning the other tracks and is applied to all simultaneously but is in a ratio in accordance with the differential time required for the wavefront to reach a more distant geophone as compared to that required for reaching the nearer one.

In displaying the seismograms the electrical waves derived from scanning the group of sound tracks are preferably applied to the deflection system of a cathode ray display tube having a luminescent screen which is preferably of the persistent type. The beam on the display tube is deflected in one dimension at a rate which is proportional to the time required for the scanning of the longitudinal dimension of one of the sound tracks; both the longitudinal deflection of the scanning beam and the horizontal deflection of the display beam may therefore be referred to as "time axis deflections." The electrical waves derived from scanning the tracks are applied to deflect the beam of the display tube in the other dimension, thus resulting in the tracing of a plurality of superposed graphs of the conventional kind (except that they are evanescent) from each of the geophones. The displacement of the time axes is then varied until the wave or group of waves representing a single reflection at each of the geophones are substantially superimposed, and from the settings required to accomplish this there may be derived both the direction and the distance of the reflecting interface. The direction of the arrival is derived primarily from the magnitudes of the settings causing the displacement.

Customarily a timing trace is recorded at the same time as are the traces of the arriving seismic waves. This timing track is usually recorded at one side of the record. As will be shown hereafter, if the scanning of the timing track be displaced coordinately in the same manner as those of the seismic tracks, there may be derived the instant at which a wave from the direction in question would be reflected back to a hypothetical geophone positioned at the point of the explosion, and this being known, circular geometry may be employed in making the plot of the data.

Among the objects of the invention, therefore, are to provide methods of and apparatus for the display of geophysical data wherein weathering corrections may be automatically preset into the device; wherein by repeated playbacks of the data coincidences may be recognized between waves reflected from various strata at various depths, the direction of arrival of the waves being directly readable from the settings; wherein the time of arrival of a reflection at the explosion point may be automatically computed, enabling the use of circular geometry in plotting the data, and wherein various correction factors and parameters can be introduced into the device to observe the effects of various assumptions, thus enabling the analyst to draw more information and to reach sounder conclusions from a given amount of recorded data.

The invention will be better understood, and additional objects and advantages of it will become apparent, in the course of the ensuing detailed description of some preferred embodiments of the invention, such description being taken in connection with the accompanying drawings, wherein.

Figure 1:
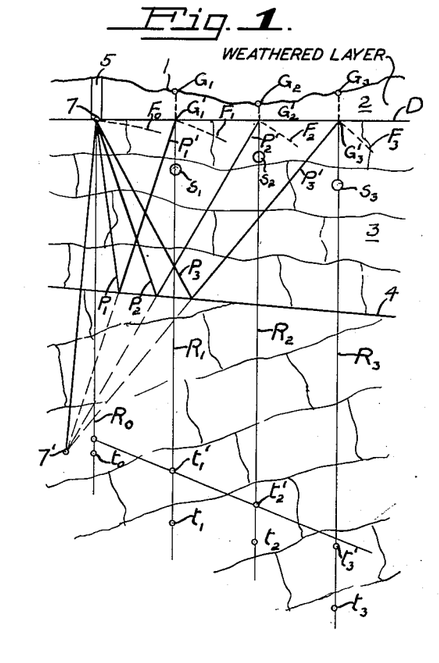
Fig. 1 is an idealized diagram of a cross-section of a terrain to be explored, indicating the position of the shot point, the weathered layer, and an array of geophones in relation to a single reflecting interface. Certain additional lines are added to this drawing to indicate time relations in the received waves as indicated upon the phonographic records.

Considering first Fig. 1, this diagram represents a cross-section of the terrain to be explored. The irregular line 1 represents the surface of the earth, above the weathered layer 2, the depth of the latter varying as shown with respect to the more consolidated underlying stratum 3. Beneath this top stratum is an interface 4 from which a reflection occurs.

A shot hole 5 is drilled through the weathered layer and into the surface of the stratum 3, an explosive charge 7 being located at the bottom of the shot hole. Geophones $G_1$, $G_2$ and $G_3$ form an array (or part of an array), being spaced at equal distances apart on an axis passing through the shot point. The geophones are placed at, or approximately at, the surface of the weathered layer, the distances of the geophones above the upper surface of the first stratum being different as shown.

When the charge 7 is fired the waves reaching the respective geophones travel by the paths $P_1'$, $P_2'$, $P_3'$, respectively, to the geophones $G_1$, $G_2$, and $G_3$. These paths are determined by the ordinary criteria for specular reflection, the waves arriving at the various geophones as though they had proceeded from the point $7'$, the latter being the virtual image of the shot point, located on a perpendicular drawn from the shot point to the reflecting interface 4 and at a distance along this perpendicular below the interface equal to the distance of the actual point 7 above it.

As has been stated, it is preferable to refer all of the data derived from the explosion to the line D which represents the surface of the stratum 3 below the weathered layer, since this line is ordinarily approximately straight and avoids the anomalies due to the differences in height of the geophones $G_1$ through $G_3$ due to the erosion of the surface. It is to this end that the weathering corrections are applied. In making these weathering corrections it is fortunately possible to assume that they are the same for all directions of arrival of the waves. This is due to the fact that the velocity of wave propagation through the weathered layer is very much lower than that through the consolidated strata beneath it. As a result of this fact, the waves passing from the underlying stratum into the weathered layer are bent toward the vertical, and since the difference in velocity between the weathered layer and the underlying stratum may frequently be 2:1 or even greater, the error involved in assuming that the waves do travel vertically, as shown by the dotted continuations of the lines $P_1'$, $P_2'$, and $P_3'$, is so small as to be negligible.

As is shown in the diagram, the geophones $G_1$, $G_2$, etc., are normally placed equal distances apart, and this distance is either the same as the distance between the shot point 7 and the first geophone $G_1$, or is an integral multiple thereof. In making the phonographic recordings of the arrival of the wavefronts at the geophones, these are normally recorded as parallel tracks on a single piece of film, the tracks also being equal distances apart, and therefore they may be considered as a sort of chart or diagram of the terrain itself. The film moves at a constant rate in making the recordings, and each of the sound tracks starts at the same instant, the initial points on the records forming a straight line across the film perpendicular to its edge. Thus if we drop perpendiculars $R_1$, $R_2$ and $R_3$ from the datum line D, each of these perpendiculars, extended upwardly, passing through the geophone points $G_1$, $G_2$ and $G_3$, these perpendiculars can be considered as representing the sound tracks on the record film. If the time trace be equally spaced from the seismic traces it can be thought of as represented by the perpendicular $R_0$ which passes through the shot point 7.

Consider now an explosion occurring at an instant $t_0$ at the point 7. The wavefront initiated thereby will travel along the path $P_1$—$P_1'$ and will arrive at the point $G_1'$, on the datum line D immediately below geophone $G_1$ at an interval $t_1'$ after the explosion which is proportional to the distance traveled. During this interval the film on which the record is being made will have moved a proportional distance, and, considering the line $R_1$ now as a record track, if the geophone were actually located at the point $G_1'$, the record of the event would appear at a point along the track corresponding to the point $t_1'$. Actually, however, the geophone is located at the surface of the weathering layer, through which it is assumed that the velocity is only half as great as in the more consolidated material, and therefore the actual record of the event will appear upon the sound track at a point $t_1$ which is a distance below the point $t_1'$ equal to twice the distance between $G_1$ and $G_1'$. The same reasoning holds as regards points $t_2$ and $t_2'$, and $t_3$ and $t_3'$.

If there actually were a geophone at the shot point 7 its record would appear on a point along the timing track at the point $t_0$, since the shot has been placed in the consolidated stratum below the weathered layer.

The times which are of actual interest are the times $t_1'$, $t_2'$, $t_3'$, etc., and it will be noted that these points lie on an arc across the sound tracks. The arcuate form in which these points lie is, of course, due to the fact that the wavefront is spherical instead of plane. In the diagram the distance of the reflecting interface below the datum line is of the same order of magnitude as the spread of the geophone array, and hence the curvature of the wave front is quite marked, as is shown by the lines $F_0$, $F_1$, $F_2$, etc. In cases of actual interest, however, the reflecting interface is probably at a distance below the datum surface which is several times the geophone spread, and therefore the wavefront approaches planarity much more closely than is here illustrated. In any event, as a first approximation, it may be considered as a plane.

Owing to the time of transit through the weathered layer, however, the actual points of record $t_1$, $t_2$, $t_3$ do not lie upon a regular curve but upon an irregular line, and if one were dealing with original seismograms this would confuse the record and make correlations between the same event as recorded upon the different seismograms difficult. In the present instance, however, dealing with a phonographically recorded record, the anomalies introduced by the weathered layer can easily be resolved by starting the reproduction of each track at a different point upon the trace corresponding to the weathering corrections; i. e., in reproducing from the trace corresponding to the line $R_3$, instead of starting the scanning of the track at the point corresponding to the datum line, it may be started at a point $S_3$ farther along the track, at a distance below the datum line equal to the distance between $t_3'$ and $t_3$.

If, in reproducing the other tracks this be done, the pickup in each case being started at a point along the record corresponding to the weathering correction, and the pickup from each track be used to draw a seismogram which starts at the same abscissa as the others and is arranged parallel thereto, the events on these seismograms will again form a smooth curve, approaching a straight line, as in the case of the points $t_1'$, $t_2'$ and $t_3'$.

With conventional seismograms arranged in this manner, there still remains the problem of matching the curves representing the same events, and determining the actual position of the instants of first arrival and the slope of the line or curve through the points indicating the same event; i. e., the "step-out" from which the direction of arrival of the waves may be deduced. In the Sonograph method, as disclosed in the prior patents above referred to, the various sound tracks are scanned simultaneously and the pickups of the various tracks are advanced or retarded along these tracks by proportional distances until maximum reinforcement between the waves is obtained, the electric waves from all of the pickups being mixed electrically and recorded as a single seismogram. The proper step-out can then be derived from the degree of advance of each of the pickups along the sound tracks.

In accordance with the present invention, a somewhat different method is used to achieve the same result. In this case the sound tracks are scanned in something the same manner as is used in television practice, and each track is used to draw a trace on the face of a cathode ray tube. Means are provided for advancing or retarding the pickup along the tracks in the scanning process, until the seismographic traces are substantially superimposed, this superposition being determined partly by the persistence of the fluoroscopic screen on which the trace appears, and partly by the persistence of vision of the eye. In so doing it is preferable that the rate of repetition of the scanning be considerably higher than the rate at which the original record was made, but this is unimportant as long as the scale factors remain the same or, at least, proportional.

In the copending application of the same inventor, Ser. No. 96,045, filed May 25, 1949, there is shown and claimed one method of electronic scanning of seismographic records and of introducing into the scanning various parameters useful to the geophysical analyst. The same methods of scanning there shown can also be used with the invention here under consideration, and the variation of parameters claimed in the prior application may also be combined with this invention. For the present purposes, however, it is preferred to use apparatus as indicated in Fig. 2 of the drawings of this specification.

Figure 2:
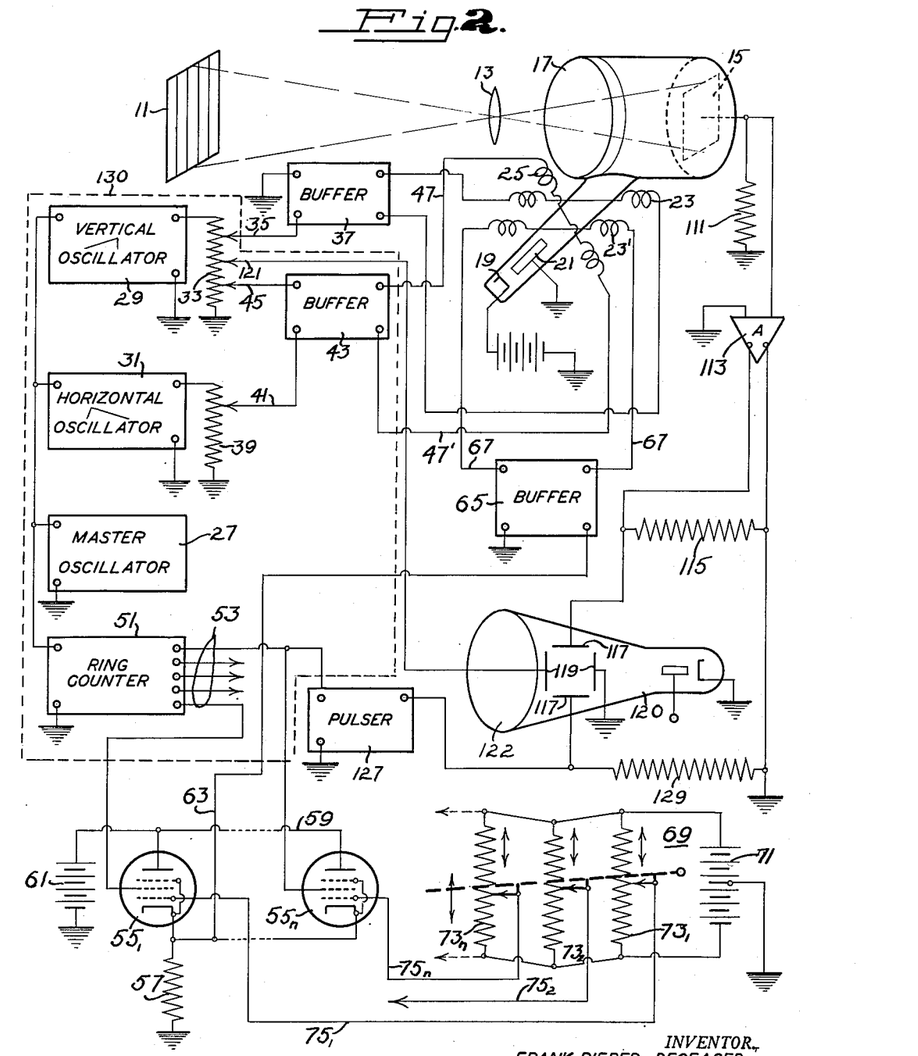
Fig. 2 is a diagram, partly in block form and partly schematic, of a preferred form of scanning and display equipment embodying the instant invention.

In the arrangement shown in Fig. 2, the reference character 11 indicates the record comprising a plurality of phonographically reproducible seismic tracks, or a portion thereof, since it is frequently desirable to consider such a record by sections rather than as a whole in order that details may be more carefully examined. An image of the record is projected by an optical system represented by the lens 13 upon a sensitive screen 15 of a television type pickup tube 17. This pickup tube may be of any of the known types; for simplicity in showing, there is illustrated the type which is known as the "iconoscope," but it is to be understood that this is merely illustrative.

The tube 17 is provided with an electron gun comprising a cathode 19 and first anode 21 for projecting a beam of electrons against the pickup screen, in well known manner. In the present case the tube is provided with two sets of deflecting coils 23 and 23' for deflecting the ray "vertically" over the sensitive screen, the vertical direction here being taken as the direction longitudinal of the sound tracks, irrespective of the actual orientation of the tube or the image. A single set of coils 25 is provided for deflecting the ray horizontally. Other types of pickup tubes have different detailed arrangements for effecting scanning, but in any case under consideration either magnetic or electric means are used for deflecting cathode rays to accomplish scanning, and these methods are all considered as equivalent, since the methods of modifying scanning generators or deflecting systems to accomplish the same results are well known in the art.

In scanning the records for the purposes here proposed either of two methods may be used, the result being essentially the same, although the organization of equipment is slightly different. In accordance with the first method each sound track is scanned in its entirety before the scanning beam passes on to the next. In this case the rate of transverse scanning is relatively low in comparison with the rate of vertical scanning. In the second method of scanning the record, the tracks are "cross-sampled" at a relatively high rate of speed, this being the method of scanning which is disclosed in the copending application, Serial No. 96,045, of the same inventor.

In the equipment diagrammed in Fig. 2, the equipment is arranged to scan each track in its entirety before passing on to the next track.

In the practical case it is desirable that a relatively large number of tracks be combined in a single record, since anomalies and accidental effects due to noise or to malfunctioning of equipment become less important, on a statistical basis, as the number of tracks analyzed increases. Therefore, while the methods here described can be used with a small number of tracks, such as five or less, it is preferred to use it with relatively large numbers; i. e., twenty-five tracks or even more. It should be recognized, therefore, that there is no absolute limitation upon the number of tracks scanned, although certain of the frequencies involved and the detail of the apparatus will vary with the number of tracks.

For illustrative purposes, therefore, it will here be assumed that the number of tracks to be scanned is twenty-four, plus a timing track, and that the scanning of all tracks is completed in one-half second. This requires that each track individually be scanned in $\frac{1}{50}$th of a second, which may be taken as approximately 200 times the speed at which the individual tracks were recorded.

The scanning is controlled by master oscillator 27, which may deliver a sinusoidal waveform or, what may be better, pulses occurring either at the rate of 50 cycles per second or, if desired, at a higher rate. The waves delivered by the master oscillator are fed to a vertical scanning oscillator 29, holding it in step either at the frequency of the master oscillator 27, or at a submultiple thereof, as is well understood. The same pulses are also fed to a horizontal oscillator 31, and by frequency division or by synchronism on a subharmonic hold the latter in step at a frequency which is $\frac{1}{25}$th of that of the vertical oscillator. Both oscillators preferably produce waveforms which are as nearly linear as is possible to obtain them.

The vertical oscillator feeds a potentiometer 33, from which a contact arm 35 takes off a potential which is fed to a buffer amplifier 37. Since, in the present case, the deflection is magnetic, the buffer 37 preferably has a high output impedance so that the current waveform which it delivers to the deflecting coils 23, to which it is connected, is substantially a replica in waveform of the voltage wave which is fed into the buffer amplifier, and is not distorted materially by the inductance of the deflecting coils.

The horizontal oscillator 31 feeds a potentiometer 39. A contact arm 41 on the potentiometer 39 connects with a buffer amplifier 43. This buffer is also fed by a small portion of the potential from the vertical oscillator 29, which is supplied through a contact arm 45 on the potentiometer 33, these arms connecting with the buffer 43 in such fashion that the input potential to the buffer is the algebraic sum of those supplied from the potentiometers 33 and 39 respectively. The oscillators 29 and 31 are connected to the buffer 43 in opposite phase, so that the potential of one is rising as that of the other falls, and the potentiometer arms 41 and 45 are adjusted in such manner that the slopes of the two waves, as fed to the buffer 43, are equal and opposite. As a result of this arrangement the output of buffer 43 is a stepped wave which changes in potential by small and very rapid increments, and then dwells at that same potential for a period corresponding to the length of time required to scan one complete track of the record, or at least that portion of a complete track which is being examined during a given period. The buffer amplifier connects through leads 47 and 47' to the horizontal scanning coils 25 of the tube 17. Like buffer 37, buffer 43 preferably is one having a high impedance output, such as a pentode, so that the current wave through the coils 25 will accurately follow the contour of the potential wave applied to the buffer.

The master oscillator 27 also feeds a ring counter or gate generator 51, which has as many stages and as many output circuits as there are tracks to be scanned. Such counters are well known in the art, and can be arranged to supply substantially square output pulses from each stage in succession as these stages are tripped by successive pulses fed from the master oscillator 27. Equipment of this type is sufficiently well known in the art so that it appears unnecessary to describe it in detail here. The output leads of the ring counter 51, which are shown collectively by the reference character 53, normally supply to the respective screen grids of a group of gating tubes a negative potential which is sufficient to prevent current flow through these tubes. When, however, the pulse from the ring counter corresponding to the excitation of a specific stage thereof is applied to the specific output circuit, the potential of the screen grid is raised so that the tube will carry current.

In the diagram of Fig. 2 only two such gating tubes are shown, being designated by the reference characters $55_1$ and $55_n$. These tubes are shown as being connected as cathode followers, having a common cathode resistor 57. The plates of all of these tubes are supplied through a lead 59 from a common source 61. A lead 63 connects from the cathode end of the resistor 57 to a buffer amplifier 65, of the same general type as buffer 37, and output leads 67 from buffer 65 connect to the second set of deflecting coils 23' of tube 17.

As is well understood, tubes connected in the cathode follower fashion which is used for tubes $55_1$ through $55_n$ will, when the cathode resistor 57 is of relatively high impedance as compared to the effective impedance of the tubes so connected, repeat into the output circuit changes of potential which are almost exactly equal to the potentials imposed upon the control grids of such tubes. In the present instance the potentials thus appearing in the outputs of these tubes are those supplied from the biasing circuits indicated generally by the reference character 69. This arrangement comprises a battery or other source of constant potential 71, preferably grounded at an intermediate point which may or may not be midpotential, which is connected across a plurality of high impedance potentiometers $73_1$ to $73_n$ inclusive, these potentiometers being equal in number to the number of tracks to be scanned. Each potentiometer feeds, through a lead $75_1$ through $75_n$, the control grid of the corresponding tube $55_1$ through $55_n$. Since all of the tubes of the 55 group save one are biased to cutoff by the potentials applied to their screen grids, only the tube to which the gate is momentarily being applied from the ring counter 51 will carry current, and there will therefore appear across the input of buffer amplifier 65 a potential which is directly proportional to the setting of the corresponding potentiometer of the 73 group. Since the current through coils 23' corresponds to the potential applied to the input of buffer 65, the scanning beam of cathode ray tube 17 will be displaced, longitudinally of the tracks, by a distance which is proportional to the setting of this potentiometer 73.

Figure 4:
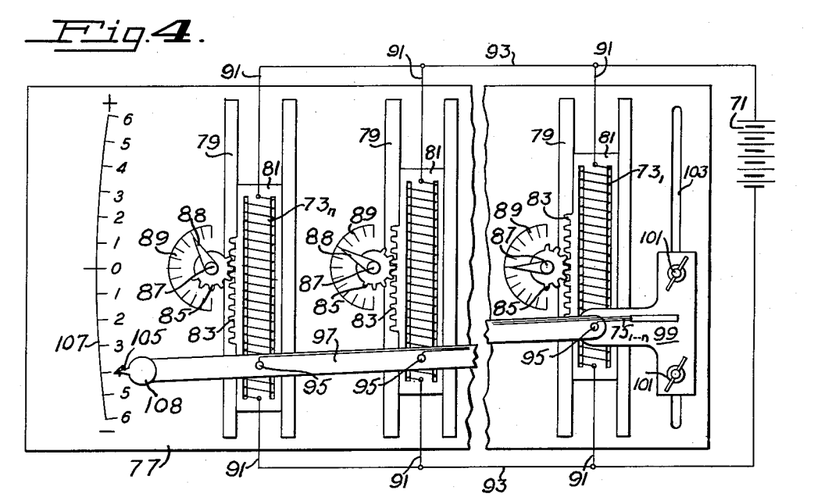
Fig. 4 is a diagram of a potentiometer group adapted for setting, independently, the weathering corrections for each of the geophones and the proportional "step-out" corrections from which the direction of the reflecting layer may be computed.

As is indicated diagrammatically in Fig. 2, and as is more clearly shown in Fig. 4, each of the potentiometers of the 73 group is provided with two adjustments which may be made independently of each other. The first of these adjustments comprises a movement of the potentiometer "card" itself, the potential taken off by the contact arm varying as the card is moved and the contact arm remains stationary.

One way of accomplishing this, which is shown because it is simplest, rather than best, is indicated in Fig. 4 of the drawings. In this case all of the potentiometers are mounted upon a base plate 77, which is provided with a plurality of slide-ways 79. Fitted within each slide-way is a slide 81 provided on one edge with a rack gear 83 meshing with a pinion 85, the pinion being mounted on a common shaft with an adjusting knob 87 which is preferably provided with an index 88 reading against a scale 89. This scale may conveniently be calibrated in milliseconds. The potentiometer cards $73_1$ through $73_n$ are fixed to the slides 81, and are connected to the source 71 through flexible leads 91 to the common busses 93. It will be seen that by turning the knobs 87 the potentiometer cards can be moved beneath the take-off contacts 95 independently of each other and independently of the positions of the latter contacts.

The take-off contacts 95 are mounted on a lever arm 97. The latter is pivoted to a bracket 99 whose position on the base plate 77 may be adjusted by wing bolts 101 working through a slot 103 in the base plate. The bracket 99 extends over the center of the potentiometer card $73_n$, and the contact 95 works through the pivot, so that adjustment of the lever arm causes no shift in the position of this contact. Swinging of the lever arm 97 will, however, change the position of the take-off contacts 95 on the other potentiometers by different but proportionate amounts. The lever arm is also provided with an index 105 reading against a scale 107 which may also conveniently be calibrated in milliseconds, the milliseconds in this case representing increments of time between the arrival of the seismic wave at successive geophones in the series.

The arm 97 can be swung by the knob 108, and the bracket 99 is proportioned so that the lever will clear the adjusting knobs 87 and there will be no interference between the two adjustments. Each of the pickup contacts 95 connects to an individual lead $75_1$ to $75_n$ as has already been described. The general arrangement shown in Fig. 4 is intended to be represented diagrammatically by the arrangement carrying similar reference characters in Fig. 2.

Where the geophones are not spaced by equal increments a lateral movement of the potentiometer cards and contacts can be provided, so that the spacings of geophones and contacts are proportional. Ordinarily the added complexity that this would involve is not warranted, since uniform spacing is desirable for many reasons, can usually be achieved, and where only one or two geophones in a large array are non-uniformly spaced it is easy to compute the deviations necessary to give the proper settings and set them up individually.

Considering for the moment that both the lever arm 97 and the knobs 87 are set at zero and that the oscillators 27, 29 and 31 are in operation, a rectangular area will be scanned upon the sensitive screen 15 of the pickup tube 17. With an image of the record 11 projected upon the screen, the scanning potentials can be adjusted by means of the potentiometer contact arms 35, 41 and 45 so that the area scanned coincides precisely with the area of the projected image, and by final adjustment of the potentiometer 45 the scanning lines may be made to be strictly parallel and along the direct line of the sound tracks, owing to the stepped form of the wave delivered by the buffer 43.

With the equipment thus adjusted, there will appear across an output resistor 111 which is provided for the tube 17 a succession of potential waves which represents, in amplitude, the successive sound tracks. These potential waves are applied to the input of an amplifier 113, the output of which connects across a resistor 115 forming part of a summing network which is connected across the vertical deflecting plates 117 of a cathode ray display tube 120. The other pair of these plates 119, which provide the horizontal deflection for the display tube, is fed by potential from the vertical oscillator 29, derived from a contact arm 121 on the potentiometer 33.

With the equipment adjusted as described, the seismograms representing the various tracks will be superposed upon each other upon the screen 122 of the tube 120 in varying phase relationships, so that the combined traces will result in a mere jumble. Therefore, preliminary to thus scanning the record, the various potentiometers 73 are adjusted by means of the knobs 87 to set into the equipment the various advances of the scanning beam corresponding to the times $t_1'$ to $t_1$, $t_2'$ to $t_2$, and so forth, as predetermined by the measurements made (usually) prior to the recording of the seismic waves. These adjustments deflect the scanning beam within the tube 17 longitudinally of the sound tracks by varying amounts proportional to the corrections that have been set into the equipment, the adjustments being made in each case in such direction that the scanning of the record tracks starts at the points $S_1$, $S_2$, $S_3$, and so forth. These adjustments do not, however, affect the horizontal deflection of the ray in the display tube 120, and as a result all of the traces on the screen 122 start at the same abscissa.

As a result of this initial adjustment the records of a particular event will appear upon the display screen as a plurality of traces, the record representing the initial wavefront being displaced along the time axis in one direction or the other in comparison to other records of the same event in accordance with whether the particular geophone considered be nearer or farther from the shot point when considered along the ray path. Movement of the lever 97 up or down will then tend either to separate the records on the various traces or to bring them closer together. In operating the device the lever 97 would be moved so as to bring the various records as nearly as possible into superposition. The farther away the reflecting surface which is responsible for the record of a particular event, and therefore the more nearly the wavefront corresponds to a plane surface, the more nearly the various traces may be brought into exact superposition. In this connection it may be observed that all of the waves will show certain irregularities, due to interferent noise, which distinguishes each of them from all others, but that since the irregularities will be unique to each specific record, whereas the similarities will be common to all, the reinforcement of the similarities will be much greater than will be the perturbations due to noise.

When the traces representative of the waves have been brought as nearly into exact alinement as is possible by moving the lever arm, it is possible that a final adjustment may be made by again using the control knobs 87, to provide an additional correction which will account for either the curvature of the wavefront or to inaccuracies in measurement of the weathering correction or in setting it into the device. This final correction should preferably be almost wholly attributable to the curvature of the wavefront if the original quantities have been properly set. The advances or delays set in by the lever arm 97 correspond to the "step-out" used in ordinary geophysical analysis, but the quantities may be much more accurately determined by the instrument than is possible with ordinary comparison by eye between the records. Furthermore, since the setting of lever 97 is a function of the direction of arrival of the wave, and since in almost every geophysical exploration different events as recorded will arrive from different directions, the use of the equipment here set forth permits the analysis of different portions of the record and the determination of these directions with extreme rapidity and ease.

It has been mentioned that the timing trace on the record is recorded in parallel with the seismic traces, and it may be scanned coordinately with the others. This trace will result in a trace on the oscillogram of entirely different form from that of the seismic traces, and if it were mixed with the seismic traces it would merely serve to confuse them. Means are therefore provided for separating the timing trace from the others on the face of the cathode ray tube by displacing it vertically therefrom. This may be accomplished by means of one of the impulses provided by the ring counter 51. The same pulse that serves in this case to operate the corresponding gate tube $55_n$ is fed into a pulse amplifier 127, the output of which is connected across a resistor 129 which connects in series with resistor 115 to form a portion of the summing network applying potential across the vertical deflection plates 117. Accordingly there is added to the amplified impulses from the tube 17 which constitute the timing trace a separate pulse which displaces this trace vertically with respect to the seismic traces and gives a method of comparison. Furthermore, since the beam in scanning the timing trace is also displaced by the potential derived from the potentiometer card $73_n$ there may be derived from this trace the time of arrival at the shot point of the wavefront representing the event, and from this there may be derived the information necessary to plot the information by circular geometry as has already been mentioned.

Figure 3:
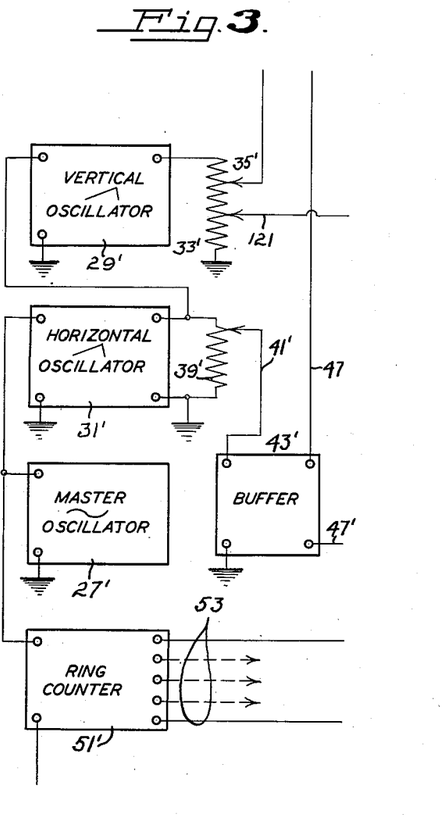
Fig. 3 is a diagram in block form indicating equipment which may be substituted for that within the dotted rectangle of Fig. 2, in order to accomplish the scanning in a different sequence than that indicated in Fig. 2.

If the scanning of the seismographic records is to be accomplished by the second or cross-sampling method, the changes required are only in the frequencies involved and in the scanning generators; i. e., within that portion of the equipment which is inclosed within the dotted lines designated by the reference character 130 in Fig. 2. The modified scanning equipment required for the cross-sampling method, used to replace the equipment shown within the dotted box 130, is shown in Fig. 3.

As has been shown in the inventor's copending application, Serial Number 96,046, the significant frequencies required for seismic analysis lie almost entirely below 85 cycles per second so that in the four seconds or thereabouts following the explosion wherein recognizable reflections may be received some 340 cycles of this highest frequency might be recorded upon each of the sound tracks. If the record is analyzed in its entirety the highest frequency should be sampled at least four times per cycle. Assuming still that there are 25 tracks to be scanned, and the entire operation is to be accomplished within one-half second, as before, this will require 340×4 samplings to be taken per track, or 68,000 samplings per second. The master oscillator 27' which provides the basic timing for the entire operation therefore operates at this frequency, or 68,000 cycles per second. This frequency is fed directly into the ring counter 51' which also operates at this frequency.

The master oscillator also feeds into the horizontal oscillator 31', and, by frequency division methods, holds it in step at $\frac{1}{25}$ of the master oscillator frequency, or 2,420 cycles per second. This frequency again may be passed through a succession of frequency dividers and used to hold the two-cycle vertical oscillator 29' in step, or the latter may be permitted to run free, since exact synchronism is not required in this case, particularly since the horizontal scanning frequency is so high in comparison to the vertical scanning frequency that the pattern will not be perceptibly rhomboidal and no special precautions will be required to make the image track. It will be understood that the frequencies given represent very nearly the extreme case. Where the cross-sampling method of scanning is used, the record would ordinarily be examined piece by piece, perhaps one second of record at a time, in which case the frequency of the master oscillator can be decreased by a factor of 4, as can the horizontal scanning frequency, the vertical scanning frequency remaining the same.

The horizontal oscillator 31' feeds into a potentiometer 39', from which the contact arm takes off directly the portion of the potential which is fed to the buffer 43'. In this instance no portion of the vertical oscillator potential is fed to the buffer, and the latter connects to the leads 47 and 47' which, as shown in Fig. 2, supply the horizontal deflecting coils. The vertical oscillator 29' also connects to a potentiometer 33', the contact arm 35' connecting to the buffer 37, also as shown in Fig. 2.

Schematically the remainder of the equipment may be exactly as is shown in Fig. 2. The ring counter, however, operates at a much higher frequency, since it must gate the tubes 55₁ to 55ₙ to displace the scanning beam longitudinally of the tracks at each transition from track to track as the beam is scanned across the record of the image. Schematically the apparatus is somewhat simpler than that shown in Fig. 2. In practice some difficulty is experienced in getting sharp pulses to deflect the beams through the magnetic scanning coils, and in general this second method is not so satisfactory as is the method first described. The traces of each of the seismograms appear upon the screen of the display tube as dotted lines, which coalesce more or less completely as the arriving waves are brought into phase by the operation of the weathering correction potentiometer adjustment and the step-out adjustment.

Figure 5:
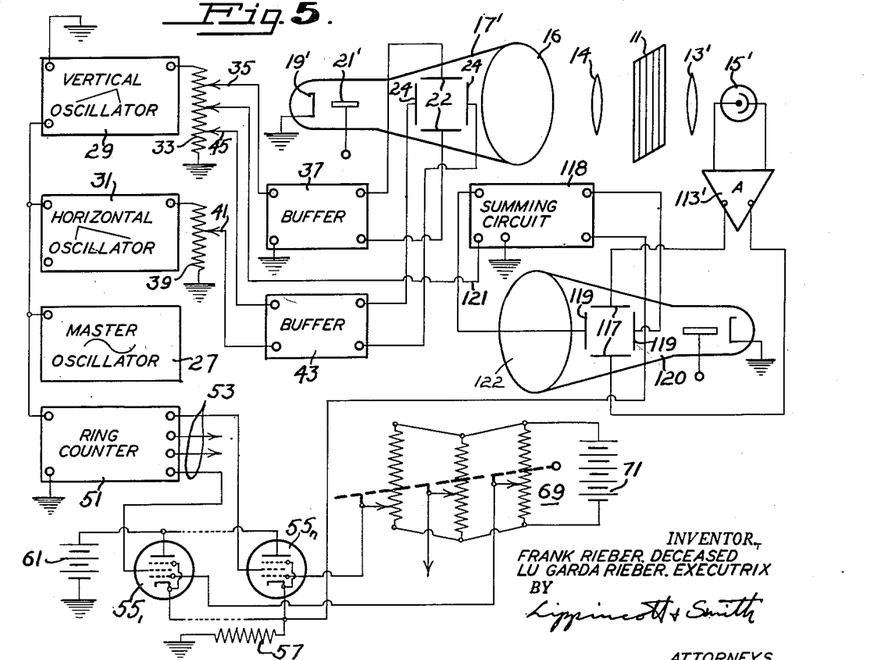
Fig. 5 is a diagram of a modification of the device wherein the displacement of the time-axis is produced upon the display surface instead of the scanner.

A third embodiment of this invention is shown in Fig. 5. In this case the displacement of the traces is accomplished at the display tube instead of at the scanning end of the system, but the method of accomplishing the displacement is actually the same and the result, as far as the particular portion of the graphs which are brought into coincidence are concerned, is also the same. In the organization of equipment shown in Fig. 5, a different method of scanning the record 11 is shown, scansion being accomplished by the "flying spot" system which is also well known in television practice.

The image of the record is focused by a lens 13' upon the cathode of a photocell 15', which acts as does the photosensitive screen 15 of Fig. 2 to convert the light impulses into electric waves. A lens 14 focuses on the record 11 an image of the fluorescent screen 16 of an ordinary cathode ray tube 17'. An electron gun comprising a cathode 19' and anode 21' projects a beam of cathode rays against the fluorescent screen 16 in the ordinary manner, the cathode ray tube being essentially of the same type as the display tube 120 already described except for the fact that the fluorescent screen should be of the instantaneous type. The cathode ray is deflected vertically by deflection plates 22, and horizontally by deflection plates 24, in the well-known manner. Magnetic deflection may also be used with a tube of this type if desired, the equivalence of these methods of deflection being well known.

As is well known, in this method of scanning, the image of the flying spot is focused upon the record to be transmitted, providing increased illumination in the area on which it falls, and increasing the brightness of this area of the image as focused on the photocell, causing proportional current to flow, this current being modified by the density of the image on the record which absorbs more or less light in accordance therewith. The pattern of the deflection of the cathode ray beam is precisely the same as that required in the embodiment shown in Fig. 2, and it is accomplished by a deflection system which is in all essentials identical with that used to deflect the beam in the Fig. 2 embodiment. All of the elements of the deflecting system being the same as are shown in Fig. 2, they are identified by the same reference characters. The only difference which may exist is that the buffers 37 and 43 may have somewhat different output impedance characteristics in order to feed deflecting plates instead of coils.

As is the case in Fig. 2, the buffer 43 serves as a mixer to combine the horizontal scanning wave with a portion of the vertical scanning wave to produce a stepped output wave and thus cause the scanning beam in the tube 17' to follow along the sound tracks of the record without lateral deviation during the scanning of the individual tracks.

The ring counter 51, the gating tubes 55₁ to 55ₙ, and the arrangement 69 for supplying the displacing potentials, are also identical with those of Fig. 2 and carry the same reference characters.

Turning to the display side of the equipment, the photocell 15' feeds an amplifier 113' which, in this case, is shown as connected directly to the vertical deflecting plates 117 of the display tube 120, the means for displacing the timing trace not being shown in this figure, although it may be applied in the same manner as has already been discussed. It is from this point on that the slight differences between the previously described circuit and that of Fig. 5 occur. The output resistor 57 of the gating tubes 55₁ to 55ₙ connects to a summing network 118. This network is also fed by a lead 121' which connects to a take-off arm on potentiometer 33. The sum of the deflecting voltage derived from the vertical oscillator 29 through potentiometer 33 and the displacement potentials derived from the correction setting device 69 through the gating tubes is fed to the horizontal deflecting plates 119 of the display tube 120.

It will be seen that this arrangement will accomplish substantially the same results as those already discussed in connection with Fig. 2. In the transmitting or scanning end of the system the entire record track is always scanned, as was not the case in the first instance, the displacement of the track being accomplished at the display tube. In the modification first described the scanning beam starts on each track part way along it, the beam being deflected toward the start of the track less than the full amount by a distance which is proportional to the correction applied. In the modification of Fig. 5, the scanning beam always starts at the beginning of the track (or of the portion thereof being analyzed) but the beam in the display tube is displaced in the direction of its origin by the amount of the correction. In one case the correction is always applied subtractively, and in the other it is always applied additively, but the displacement of the record of a given event on the screen of the display tube is by the same amount in each case and the method of applying the correction is effectively the same.

Many modifications of the invention as herein described may be made by those skilled in the art. Other methods may be used to develop the stepped wave to cause the scanning beam to follow the sound track accurately. The stepped waves used in scanning at the pick up may also be applied to the display tube to separate the traces thereon, in much the same manner as in the case of the timing trace, thus giving a presentation corresponding more closely to the usual seismographic record. Many different types of scanning tube may be used, and different types of gating tubes and counters are possible. The descriptions here given are therefore not intended to be limiting, but protection for the invention is desired within the scope of the following claims.

What is claimed is:

1. Apparatus for the display of geophysical data recorded as a plurality of parallel phonographically reproducible tracks of variable light reactive value comprising a television pickup tube of the type wherein a beam of cathode rays is deflected in two dimensions to effect scanning of images projected on a photosensitive element incorporated within said tube, means for deflecting said cathode ray beam, means for projecting an image of said tracks on said element, a source of electrical oscillations of one frequency connected to said deflection means to scan said images longitudinally of said tracks, a source of electrical oscillations of a different frequency connected to said deflection means to scan said images transversely of said tracks, means also connected to said deflecting means for applying thereto pulses to deflect the scansion of each track longitudinally thereof during the interval when each separate track is being scanned, and means for varying individually the amplitude of the pulses applied to the separate tracks.

2. Apparatus in accordance with claim 1 wherein said amplitude varying means includes both means for varying the amplitude of individual pulses by arbitrary increments and means for varying the amplitude of all of said pulses simultaneously by amounts proportional to the order in which said tracks are scanned.

3. Apparatus for the display of geophysical data recorded as a plurality of parallel phonographically reproducible tracks of variable light reactive value comprising means for scanning said tracks including means for generating a beam of cathode rays and means for deflecting said beam in two dimensions, one longitudinal of said tracks and the other transverse thereto, a generator of electrical oscillations of one frequency connected to said deflecting means to deflect said beam longitudinally of said tracks, a second generator of electric waves of a different frequency connected to said deflecting means to deflect said beam transversely of said tracks, pulse means synchronized with said second generator at a frequency which is a multiple thereof depending upon the number of tracks to be scanned, said pulse generating means being connected to said deflecting means to displace said cathode ray beam longitudinally of said tracks, and means for varying the amplitude of said pulses to apply a different displacement to said beam in scanning each different track.

4. Apparatus in accordance with claim 3 comprising individual means for arbitrarily varying the value of the pulses applied in scanning the successive tracks and coordinated means for additionally varying the amplitude of all of said pulses in ratios proportional to the order of the scanning of said tracks.

5. Apparatus in accordance with claim 3 including a plurality of separate means for varying the amplitudes of the pulses applied to displace the cathode ray beam in scanning each track in accordance with a plurality of separate corrections to be applied.

6. Apparatus for the display of geophysical data recorded as a plurality of parallel phonographically reproducible tracks of variable light reactive value comprising a cathode ray scanning tube and a cathode ray display tube, bidimensional deflecting means associated with each of said tubes, a generator of sawtooth electrical waves of one frequency connected to the deflecting means of both of said tubes to produce a co-ordinate time-axis deflection of the cathode rays therein, a second generator of electric waves of a different frequency connected to the deflecting means of said scanning tube to deflect the cathode rays therein in a direction normal to said time axis deflection, means connected to the deflecting means of one only of said tubes for producing an integral number of electrical pulses of various amplitudes in each cycle of said second generator to displace the time axis deflection therein longitudinally thereof, and means for controlling individually the amplitudes of the pulses produced in each epoch of the cycle of said second generator.

7. Apparatus in accordance with claim 6 wherein said pulse generating means are connected to deflect the cathode rays of said scanning tube.

8. Apparatus in accordance with claim 6 wherein said pulse generating means are connected to deflect the cathode ray beam of said display tube.

9. Apparatus in accordance with claim 6 including means for simultaneously adjusting the amplitudes of the successive pulses in each cycle by progressive substantially equal increments.

10. Apparatus in accordance with claim 6 wherein said pulse generating means comprises a plurality of gate tubes, means for applying individual bias potentials to each of said gate tubes, and means for applying a gate potential successively to said gate tubes.

11. Apparatus in accordance with claim 6 including a master oscillator connected to synchronize said second generator at a sub-multiple frequency, a ring counter actuated by successive cycles of said master oscillator, a plurality of gate tubes, circuits connecting each gate tube to a different stage of said ring counter to cause one only of said gate tubes to conduct current upon actuation of each stage, and means for applying an individually adjustable bias to each gate tube to control the current carried thereby when in conducting condition.

12. Apparatus in accordance with claim 6 wherein said second generator of electric waves produces a stepped waveform.

13. The method of displaying geophysical data recorded as a plurality of phonographically reproducible tracks as luminous graphs upon a screen which comprises the steps of producing upon said screen an elementary luminous area, simultaneously scanning said tracks and displacing said area in one dimension across said screen by an amount proportional to the distance traversed along said tracks in scanning the same and in the other dimension in accordance with the instantaneous values of the data recorded, and additionally producing relative displacements of said area individual to the tracks being scanned to aline in a direction normal to said first mentioned displacement deflections in said second mentioned dimension produced by records of the same event as recorded on different tracks.

14. The method in accordance with claim 13 wherein said data comprise seismic waves received by a plurality of receptors at different distances from a shot point, and said relative displacements are a function of the distances of said receptors from said shot point.

15. The method in accordance with claim 13 wherein said data comprise seismic waves received by a plurality of receptors at different distances from a shot point and a timing wave, and said relative displacements are a function of the distance of said receptors from said shot point, the relative displacement applied with respect to the record of said timing wave being that appropriate to a receptor at zero distance from said shot point.

16. The method in accordance with claim 13 which includes the step of additionally deflecting said area in said second mentioned dimension while at least one of said tracks is being scanned to separate the graph appertaining to said track from that appertaining to any other track.

17. The method of displaying as an area of illumination on a screen geophysical data recorded as a plurality of parallel phonographically reproducible tracks, which comprises the steps of generating two electric waves of different frequencies, at least one of said waves being of sawtooth waveform, generating a luminous area upon said screen, applying said sawtooth wave to scan said tracks longitudinally thereof and to deflect said luminous area across said screen in one dimension, applying said other wave to scan said tracks transversely thereof, applying the recorded data to deflect said area in the other dimension, generating in synchronism with the scanning of each succeeding track an electrical pulse of predeterminable amplitude, applying said pulses to cause a relative displacement of the scanning of the individual tracks with respect to the deflection of said luminous area and varying the relative amplitudes of pulses so applied to bring into alinement deflections of said area in said other dimension in response to data representative of the same event as recorded on the various tracks.

18. The method in accordance with claim 17 wherein one of said electrical waves is of stepped waveform and of lower frequency than said sawtooth wave, the number of steps in said waveform corresponding to the number of tracks to be scanned, whereby the portion of each track scanned is scanned in its entirety before the scanning of a succeeding track, and said pulses are of equal duration with that of the steps of said waveform.

19. The method in accordance with claim 17 wherein said pulses are applied to displace the scanning of said tracks longitudinally thereof.

20. The method in accordance with claim 17 wherein said pulses are applied to displace the deflection of said luminous area.

LU GARDA RIEBER,
*Executrix under the last will and testament of Frank Rieber, deceased.*

No references cited.